US 8,858,388 B2

(12) United States Patent
McCune et al.

(10) Patent No.: US 8,858,388 B2
(45) Date of Patent: Oct. 14, 2014

(54) GAS TURBINE ENGINE GEAR TRAIN

(75) Inventors: Michael E. McCune, Colchester, CT (US); Lawrence E. Portlock, Bethany, CT (US); Frederick M. Schwarz, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/340,737

(22) Filed: Dec. 30, 2011

(65) Prior Publication Data
US 2012/0237334 A1 Sep. 20, 2012

Related U.S. Application Data

(63) Continuation-in-part of application No. 11/504,220, filed on Aug. 15, 2006.

(51) Int. Cl.
F16H 57/08 (2006.01)
F01D 5/02 (2006.01)
F02C 7/36 (2006.01)
F16H 57/04 (2010.01)

(52) U.S. Cl.
CPC .......... *F01D 5/027* (2013.01); *F16H 2057/085* (2013.01); *F05D 2260/40311* (2013.01); *F05D 2220/36* (2013.01); *F05D 2240/70* (2013.01); *F02C 7/36* (2013.01); *F16H 57/0423* (2013.01); *F16H 57/0486* (2013.01); *F05D 2260/34* (2013.01)
USPC ............................. 475/331; 475/159; 475/160

(58) Field of Classification Search
USPC ......................... 475/159, 160, 331
See application file for complete search history.

(56) References Cited

U.S. PATENT DOCUMENTS

| 2,684,591 | A | | 7/1954 | Lundquist |
| 3,160,026 | A | | 12/1964 | Rosen |
| 3,352,178 | A | | 11/1967 | Lindgren et al. |
| 3,722,323 | A | | 3/1973 | Welch |
| 4,583,413 | A | * | 4/1986 | Lack ............................. 475/159 |
| 4,896,499 | A | | 1/1990 | Rice |
| 5,081,832 | A | | 1/1992 | Mowill |

(Continued)

FOREIGN PATENT DOCUMENTS

| EP | 1114949 | 7/2001 |
| EP | 1876338 A2 | 1/2008 |

(Continued)

OTHER PUBLICATIONS

Dudley, "Gear Handbook: The Design, Manufacture, and Application of Gears", McGraw-Hill, Inc., 1962, pp. 3-14 and 3-15.*

(Continued)

*Primary Examiner* — Derek D Knight
(74) *Attorney, Agent, or Firm* — Carlson, Gaskey & Olds, P.C.

(57) ABSTRACT

An epicyclic gear train includes a carrier that supports star gears that mesh with a sun gear. A ring gear surrounds and meshes with the star gears. The star gears are supported on respective journal bearings. Each of the journal bearings includes a peripheral journal surface and each of the star gears includes a radially inner journal surface that is in contact with the peripheral journal surface of the respective journal bearing. The epicyclic gear train has a gear reduction ratio of greater than or equal to about 2.3.

27 Claims, 2 Drawing Sheets

(56) References Cited

U.S. PATENT DOCUMENTS

| | | | |
|---|---|---|---|
| 5,211,541 | A | 5/1993 | Fledderjohn et al. |
| 5,302,031 | A | 4/1994 | Yuasa |
| 5,391,125 | A | 2/1995 | Turra et al. |
| 5,433,674 | A | 7/1995 | Sheridan et al. |
| 5,466,198 | A | 11/1995 | McKibbin et al. |
| 5,472,383 | A | 12/1995 | McKibbin |
| 6,223,616 | B1 * | 5/2001 | Sheridan ................ 475/159 |
| 6,402,654 | B1 | 6/2002 | Lanzon et al. |
| 6,530,858 | B1 | 3/2003 | Usoro et al. |
| 6,669,597 | B1 | 12/2003 | Usoro et al. |
| 6,732,502 | B2 | 5/2004 | Seda et al. |
| 7,021,042 | B2 | 4/2006 | Law |
| 7,591,754 | B2 | 9/2009 | Duong et al. |
| 7,662,059 | B2 | 2/2010 | McCune |
| 7,704,178 | B2 * | 4/2010 | Sheridan et al. ........ 475/331 |
| 8,074,440 | B2 | 12/2011 | Kohlenberg |
| 2002/0064327 | A1 | 5/2002 | Toda et al. |
| 2004/0112041 | A1 | 6/2004 | Law |
| 2005/0026745 | A1 | 2/2005 | Mitrovic |
| 2008/0006018 | A1 | 1/2008 | Sheridan et al. |
| 2008/0044276 | A1 | 2/2008 | McCune et al. |
| 2008/0116009 | A1 | 5/2008 | Sheridan et al. |
| 2009/0056306 | A1 | 3/2009 | Suciu et al. |
| 2009/0090096 | A1 | 4/2009 | Sheridan |
| 2009/0293278 | A1 | 12/2009 | Duong et al. |
| 2009/0298640 | A1 | 12/2009 | Duong et al. |
| 2011/0130246 | A1 | 6/2011 | McCune |
| 2012/0243971 | A1 * | 9/2012 | Mccune et al. ........ 475/331 |

FOREIGN PATENT DOCUMENTS

| | | |
|---|---|---|
| EP | 2224100 | 9/2010 |
| EP | 2559913 A1 | 2/2013 |
| FR | 1357038 | 4/1964 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

Zalud, "Gears Put a New Spin on Turbofan Performance" Machine Design, Nov. 5, 1998, 2010Penton Media, Inc., 5 pp.

Kandebo; Geared-Turbofan Engine Design Targets Cost, Complexity, Aviation Week & Space Technology; New York; Feb. 23, 1998, 4 pp.

Hendricks et al, "Performance and Weight Estimates for an Advanced Open Rotor Engine" NASA/TM-2012-217710, Sep. 2012, 20 pp.

Gunston, "Jane's Aero-Engines" Pratt & Whitney/USA, Mar. 2000, JAEng-Issue 7, 5 pp.

Japanese Office Action for Japanese Application No. 2007-202444, Aug. 3, 2010.

European Search Report for EP Application No. 07253078.5, Dec. 5, 2007.

European Search Report and Written Opinion for European Application No. EP 12 19 8136 completed on Aug. 21, 2013.

International Search Report and Written Opinion for International Application No. PCT/US2012/071906 completed on Aug. 22, 2013.

Meier, N. (2005). Civil Turbojet/Turbofan Specifications. Retrieved from http://www.jet-engine.net/civtfspec.html.

* cited by examiner

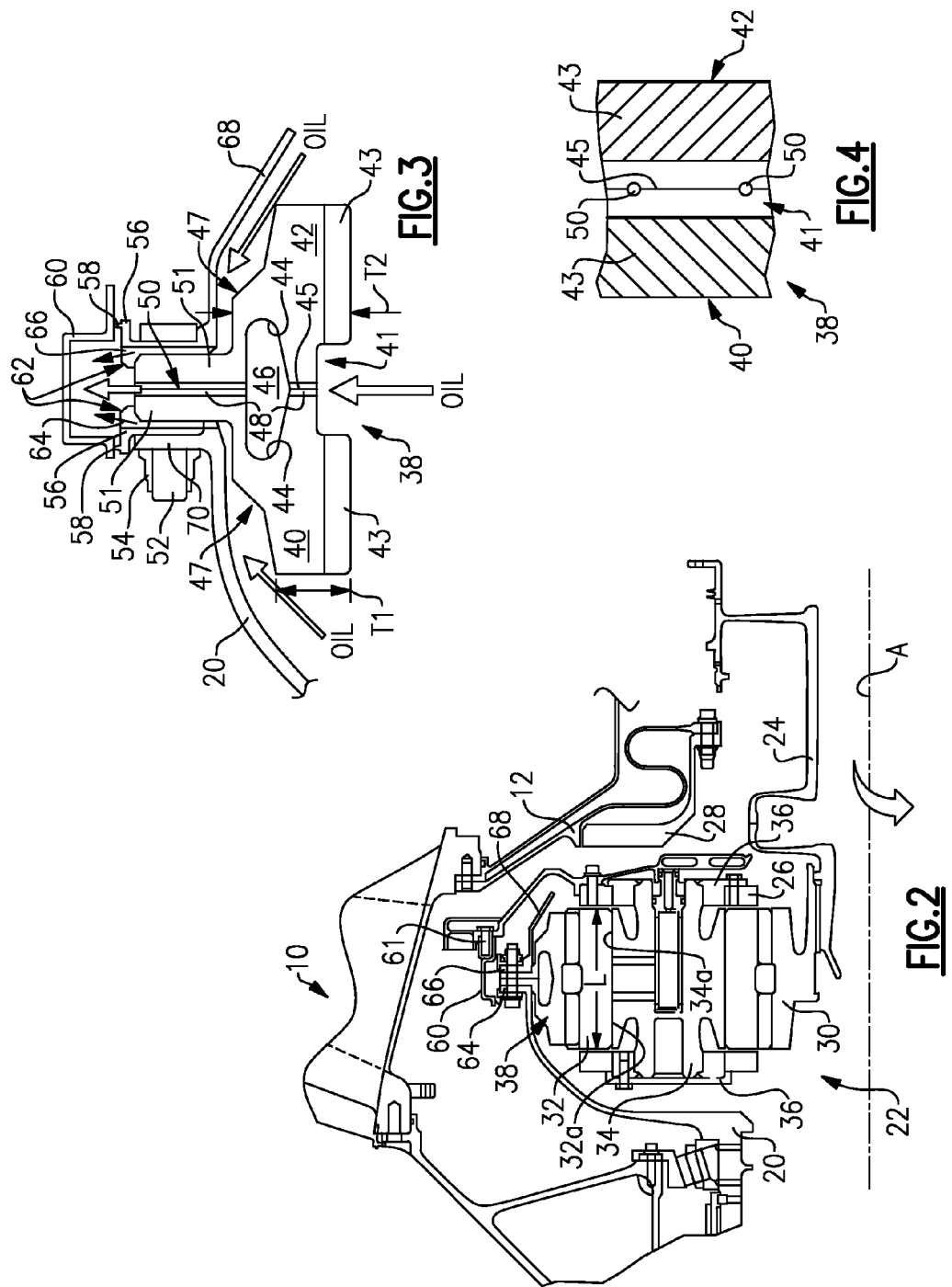

GAS TURBINE ENGINE GEAR TRAIN

CROSS REFERENCE TO RELATED APPLICATIONS

The present disclosure is a continuation-in-part of U.S. patent application Ser. No. 11/504,220, filed Aug. 15, 2006.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY

A disclosed example gear apparatus according to a non-limiting exemplary embodiment includes an epicyclic gear train including a carrier supporting star gears that mesh with a sun gear, and a ring gear surrounding and meshing with the star gears, the star gears being supported on respective journal bearings. Each of the journal bearings including a peripheral journal surface and each of the star gears including a radially inner journal surface in contact with the peripheral journal surface of the respective journal bearing. The epicyclic gear train including a gear reduction ratio of greater than or equal to about 2.3.

In a further embodiment of the foregoing gear apparatus, the radially inner journal surface of each of the star gears is in contact with the peripheral journal surface of the respective journal bearing along an axial length with respect to a rotational axis of the respective star gear.

In a further embodiment of the foregoing gear apparatus, the radially inner journal surface of each of the star gears is in contact with the peripheral journal surface of the respective journal bearing along a substantially full axial length of the respective star gear with respect to a rotational axis of the respective star gear.

In a further embodiment of the foregoing gear apparatus, the epicyclic gear train has a gear reduction ratio of greater than or equal to 2.3.

In a further embodiment of the foregoing gear apparatus, the epicyclic gear train has a gear reduction ratio of greater than or equal to about 2.5.

In a further embodiment of the foregoing gear apparatus, the epicyclic gear train has a gear reduction ratio of greater than or equal to 2.5.

A disclosed turbine engine according to another non-limiting exemplary embodiment includes a turbine shaft, a fan, and an epicyclic gear train coupled between the turbine shaft and the fan, the epicyclic gear train including a carrier supporting star gears that mesh with a sun gear, and a ring gear surrounding and meshing with the star gears. Each of the star gears is supported on a respective journal bearing and each journal bearing includes a peripheral journal surface and each of the star gears includes a radially inner journal surface in contact with the peripheral journal surface of the respective journal bearing. The epicyclic gear train including a gear reduction ratio of greater than or equal to about 2.3.

In a further embodiment of the foregoing turbine engine, the radially inner journal surface of each of the star gears is in contact with the peripheral journal surface of the respective journal bearing along an axial length with respect to a rotational axis of the respective star gear.

In a further embodiment of the foregoing turbine engine the radially inner journal surface of each of the star gears is in contact with the peripheral journal surface of the respective journal bearing along a substantially full axial length of the respective star gear with respect to a rotational axis of the respective star gear.

In a further embodiment of the foregoing turbine engine, the epicyclic gear train has a gear reduction ratio of greater than or equal to 2.3.

In a further embodiment of the foregoing turbine engine, the epicyclic gear train has a gear reduction ratio of greater than or equal to about 2.5.

In a further embodiment of the foregoing turbine engine, the epicyclic gear train has a gear reduction ratio of greater than or equal to 2.5.

In a further embodiment of the foregoing turbine engine the fan defines a bypass ratio of greater than about ten (10) with regard to a bypass airflow and a core airflow.

In a further embodiment of the foregoing turbine engine, the fan defines a bypass ratio of greater than about 10.5:1 with regard to a bypass airflow and a core airflow.

In a further embodiment of the foregoing turbine engine, the fan defines a bypass ratio of greater than ten (10) with regard to a bypass airflow and a core airflow.

In a further embodiment of the foregoing turbine engine, the fan defines a pressure ratio that is less than about 1.45.

In a further embodiment of the foregoing turbine engine, the fan defines a pressure ratio that is that is less than 1.45.

Although different examples have the specific components shown in the illustrations, embodiments of this invention are not limited to those particular combinations. It is possible to use some of the components or features from one of the examples in combination with features or components of another of the examples.

These and other features disclosed herein can be best understood from the following specification and drawings, the following of which is a brief description.

BRIEF DESCRIPTION OF THE DRAWINGS

FIG. 2 is an enlarged cross-sectional view of the epicyclic gear train shown in FIG. 1.

FIG. 3 is an enlarged cross-sectional view of an example ring gear similar to the arrangement shown in FIG. 2.

FIG. 4 is a view of the ring gear shown in FIG. 3 viewed in a direction that faces the teeth of the ring gear in FIG. 3.

DETAILED DESCRIPTION

Figure 1:
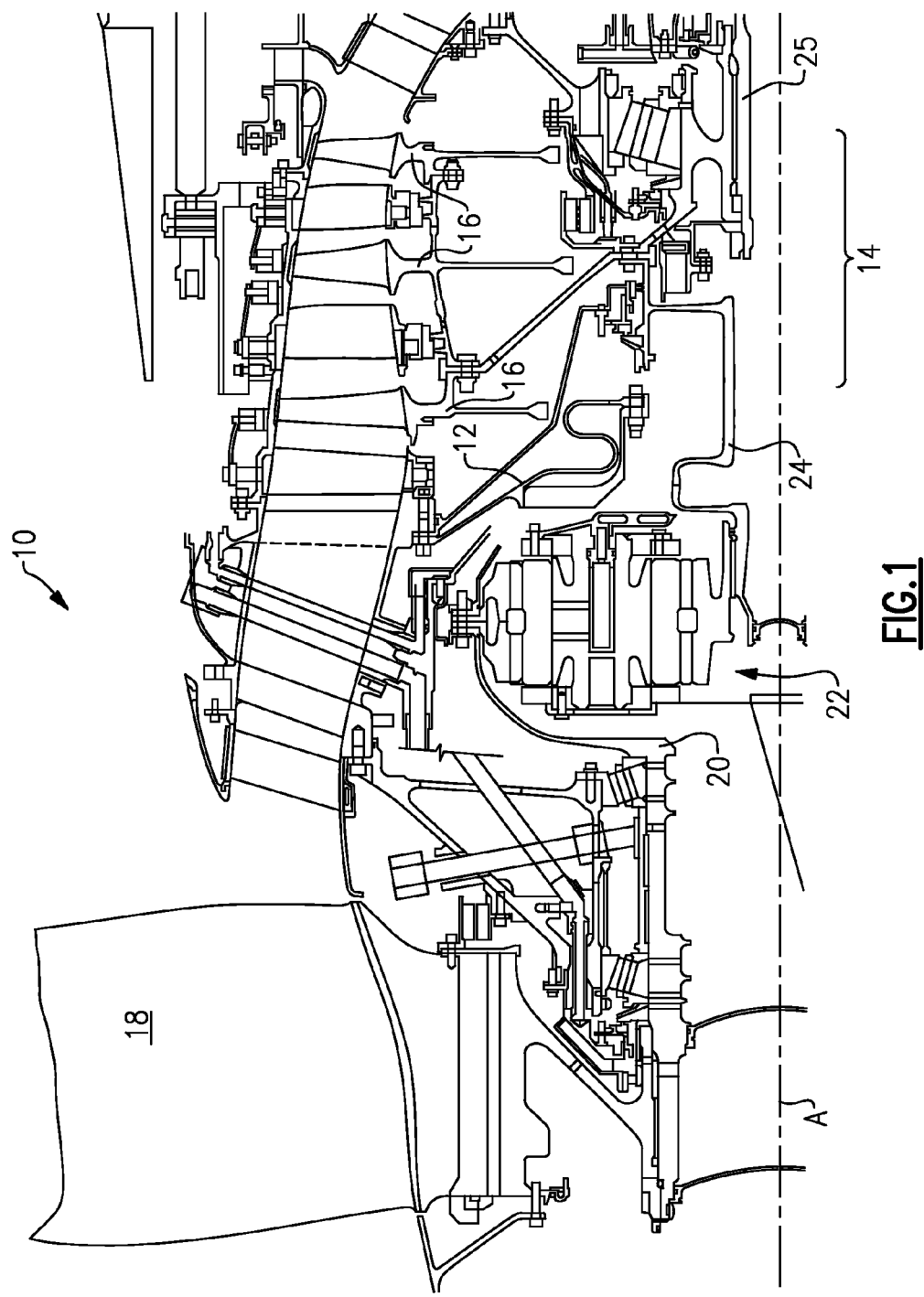
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

The star gears 32 are supported on respective ones of the journal bearings 34, Each of the journal bearings 34 includes a peripheral journal surface 34a and each of the star gears 32 includes a radially inner journal surface 32a that is in contact with the peripheral journal surface 34a of the respective journal bearing 34. The radially inner journal surface 32a of each of the star gears 32 is in contact with the peripheral journal surface 34a of the respective journal bearing 34 along an axial length L, with respect to a rotational axis of the respective star gear 32, which is substantially parallel to the axis A. In this example, the radially inner journal surface 32a of each of the star gears 32 is in contact with the peripheral journal surface 34a of the respective journal bearing 34 along a substantially full axial length L of the respective star gear 32. Thus, the journal bearings 34 provide a "line" contact. In comparison, a ball bearing would provide a "point" contact. The "line" contact between the journal bearings 34 and the star gears 32 distributes loads on the journal bearings 34, rather than focusing the load at a single point, and thereby enhances the durability of the epicyclic gear train 22.

In one disclosed, non-limiting embodiment, the engine 10 has a bypass ratio that is greater than about six (6) to ten (10), the epicyclic gear train 22 is a planetary gear system or other gear system with a gear reduction ratio of greater than about 2.3 or greater than about 2.5, and a low pressure turbine of the engine 10 has a pressure ratio that is greater than about 5. In one disclosed embodiment, the engine 10 bypass ratio is greater than about ten (10:1) or greater than about 10.5:1, the turbofan 18 diameter is significantly larger than that of the low pressure compressor of the compressor section 14, and the low pressure turbine has a pressure ratio that is greater than about 5:1. In one example, the epicyclic gear train 22 has a gear reduction ratio of greater than about 2.3:1 or greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fan 18 of the engine 10 is designed for a particular flight condition—typically cruise at about 0.8 M and about 35,000 feet. The flight condition of 0.8 M and 35,000 ft, with the engine at its best fuel consumption—also known as "bucket cruise TSFC"—is the industry standard parameter of lbm of fuel being burned divided by lbf of thrust the engine produces at that minimum point. "Low fan pressure ratio" is the pressure ratio across the fan blade alone. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gear apparatus, comprising:
an epicyclic gear train including a carrier supporting star gears that mesh with a sun gear, and a ring gear surrounding and meshing with the star gears, the star gears being supported on respective journal bearings, each of the journal bearings including a peripheral journal surface and each of the star gears including a radially inner journal surface in contact with the peripheral journal surface of the respective journal bearing, wherein the epicyclic gear train has a gear reduction ratio of greater than or equal to about 2.3, the ring gear including an inner periphery with teeth, an outer circumferential surface opposite the teeth and a flange projecting radially outwards from the outer circumferential surface, the flange including at least one lubricant passage opening at the inner periphery and at a radially outer tip of the flange, the ring gear also including a forward portion and an aft portion that meet at an interface extending radially through the flange, the forward portion and the aft portion defining an annular cavity along the interface, the annular cavity interrupting the at least one lubricant passage.

2. The gear apparatus as recited in claim 1, wherein the radially inner journal surface of each of the star gears is in contact with the peripheral journal surface of the respective journal bearing along an axial length with respect to a rotational axis of the respective star gear.

3. The gear apparatus as recited in claim 1, wherein the radially inner journal surface of each of the star gears is in contact with the peripheral journal surface of the respective journal bearing along a substantially full axial length of the respective star gear with respect to a rotational axis of the respective star gear.

4. The gear apparatus as recited in claim 1, wherein the epicyclic gear train has a gear reduction ratio of greater than or equal to 2.3.

5. The gear apparatus as recited in claim 1, wherein the epicyclic gear train has a gear reduction ratio of greater than or equal to about 2.5.

6. The gear apparatus as recited in claim 1, wherein the epicyclic gear train has a gear reduction ratio of greater than or equal to 2.5.

7. The gear apparatus as recited in claim 1, wherein the at least one lubricant passage includes a plurality of lubricant passages circumferentially spaced around the ring gear.

8. The gear apparatus as recited in claim 1, wherein the ring gear has a forward portion and an aft portion that meet at an interface extending radially through the flange, the at least one lubricant passage being defined by coextending grooves in the forward portion and the aft portion along the interface.

9. A turbine engine comprising:
a turbine shaft;
a fan; and
an epicyclic gear train coupled between the turbine shaft and the fan, the epicyclic gear train including a carrier supporting star gears that mesh with a sun gear, and a ring gear surrounding and meshing with the star gears, each of the star gears being supported on a respective journal bearing, each journal bearing including a peripheral journal surface and each of the star gears including a radially inner journal surface in contact with the peripheral journal surface of the respective journal bearing, wherein the epicyclic gear train has a gear reduction ratio of greater than or equal to about 2.3, the ring gear including an inner periphery with teeth, an outer circumferential surface opposite the teeth and a flange projecting radially outwards from the outer circumferential surface, the flange including at least one lubricant passage opening at the inner periphery and at a radially outer tip of the flange, the ring gear also including a forward portion and an aft portion that meet at an interface extending radially through the flange, the forward portion and the aft portion defining an annular cavity along the interface, the annular cavity interrupting the at least one lubricant passage.

10. The turbine engine as recited in claim 9, wherein the radially inner journal surface of each of the star gears is in contact with the peripheral journal surface of the respective journal bearing along an axial length with respect to a rotational axis of the respective star gear.

11. The turbine engine as recited in claim 9, wherein the radially inner journal surface of each of the star gears is in contact with the peripheral journal surface of the respective journal bearing along a substantially full axial length of the respective star gear with respect to a rotational axis of the respective star gear.

12. The turbine engine as recited in claim 9, wherein the epicyclic gear train has a gear reduction ratio of greater than or equal to 2.3.

13. The turbine engine as recited in claim 9, wherein the epicyclic gear train has a gear reduction ratio of greater than or equal to about 2.5.

14. The turbine engine as recited in claim 9, wherein the epicyclic gear train has a gear reduction ratio of greater than or equal to 2.5.

15. The turbine engine as recited in claim 9, wherein the fan defines a bypass ratio of greater than about ten (10) with regard to a bypass airflow and a core airflow.

16. The turbine engine as recited in claim 9, wherein the fan defines a bypass ratio of greater than about 10.5:1 with regard to a bypass airflow and a core airflow.

17. The turbine engine as recited in claim 9, wherein the fan defines a bypass ratio of greater than ten (10) with regard to a bypass airflow and a core airflow.

18. The turbine engine as recited in claim 9, wherein the fan defines a pressure ratio that is less than about 1.45.

19. The turbine engine as recited in claim 9, wherein the fan defines a pressure ratio that is that is less than 1.45.

20. The turbine engine as recited in claim 9, wherein the at least one lubricant passage includes a plurality of lubricant passages that are circumferentially spaced around the ring gear.

21. The turbine engine as recited in claim 9, wherein the ring gear has a forward portion and an aft portion that meet at an interface extending radially through the flange, the at least one lubricant passage being defined by coextending grooves in the forward portion and the aft portion along the interface.

22. A gas turbine engine comprising:
a turbine section comprising:
a first turbine section; and
a second turbine section, the second turbine section having a pressure ratio of greater than about 5.0;
a gear train configured to be driven by the second turbine section, the gear train comprising:
a carrier supporting intermediate gears that mesh with a sun gear, and a ring gear surrounding and meshing with the intermediate gears, the ring gear comprising:

an inner periphery and an outer periphery opposite the inner periphery and at least one lubricant passage opening at the inner periphery and at the outer periphery; and a fan configured to be driven by the gear train at a speed lower than the speed of the second turbine section.

23. The gas turbine engine of claim 22 further comprising:

a compressor section; and a bypass duct, wherein the fan is configured to drive a first portion of air into the compressor and a second portion of air into the bypass duct, and wherein a bypass ratio defined as the volume of area driven into the bypass duct divided by the volume of air driven into the compressor is greater than about 6.0.

24. The gas turbine engine of claim 23, wherein a gear ratio of the gear train is greater than about 2.3.

25. The gas turbine engine of claim 24, wherein the bypass ratio is greater than about 10.0.

26. The gas turbine engine of claim 23, wherein the bypass ratio is greater than about 10.0.

27. The gas turbine engine of claim 23, wherein a shaft of the fan and the ring gear are rotationally balanced.

\* \* \* \* \*